United States Patent [19]
Coleman

[11] Patent Number: 6,005,670
[45] Date of Patent: Dec. 21, 1999

[54] EFFICIENT IDENTIFICATION OF PREDICTED PRINTER DEFECTS FOR ANAMORPHIC PRE-COMPENSATION

[75] Inventor: Robert M. Coleman, Altadena, Calif.

[73] Assignee: Xerox Corporation, Stamford, Conn.

[21] Appl. No.: 09/222,485

[22] Filed: Dec. 28, 1998

[51] Int. Cl.$^6$ .................................................... G06F 15/00
[52] U.S. Cl. ........................ 358/1.9; 358/1.11; 358/1.14
[58] Field of Search ........................... 358/1.9, 1.6, 1.11, 358/1.14; 707/511, 529; 1/526

[56] References Cited

U.S. PATENT DOCUMENTS

| 5,754,750 | 5/1998 | Butterfield et al. | 395/118 |
| 5,797,320 | 8/1998 | Buschulte et al. | 101/226 |
| 5,852,679 | 12/1998 | Shimizu | 382/180 |

*Primary Examiner*—Jerome Grant, II
*Attorney, Agent, or Firm*—Robert Cunha

[57] ABSTRACT

Every printing system has characteristic defects which detract from high quality printing. Xerographic printing systems show defects such as banding, mottled colors in large fill areas, trail-edge deletion and starvation where toner concentrations drop at certain color edges, misregistration, and so on. Ink jet printing systems can show ink bleeding, streaking in the direction of head movement, and so on. One approach to reducing predictable printer defects is to modify the digital data being sent to the printer to pre-compensate for the defect. One pre-compensation method identifies runs of color which meet the criteria likely to cause a printing defect and applies a function f(edge-distance, object-type) to such runs to modify them appropriately. However, if multiple defects are being corrected, an efficient method is needed to identify potential defects since a normal search procedure performed on a band of collected runs one at a time for each defect is time-consuming. Instead, a method is described by which modules responsible for detecting and correcting each defect register patterns of runs with a search module that are predicted to trigger defects. These registered patterns can then be applied as keys to a lookup table to quickly find if a printer defect pattern has been found, and which correction module to call to pre-compensate for the defect.

6 Claims, 7 Drawing Sheets

EFFICIENT IDENTIFICATION OF PREDICTED PRINTER DEFECTS FOR ANAMORPHIC PRE-COMPENSATION

BACKGROUND OF THE INVENTION

1. Field of the Invention

The present invention relates to high-quality digital printing in which objects are intermixedly printed, and more particularly, in which a printing process exhibits characteristic, statistically predictable defects which degrade quality. In order to apply a system-specific and defect-specific function to the digital signal to pre-compensate for a defect and thereby increase quality, an efficient search method is used to identify candidate printer defects and apply the correct pre-compensation function.

2. Description of the Related Art

Digital color printers form a digital image for each of several separations, such as cyan, magenta, yellow, and black. The digital image instructs the printing mechanism of the printer in the amount of each color ink to deposit and the method of deposition at each addressable point on the page.

A digitally imaged page can consist of graphical objects such as text, lines, fills, pictures, etc, all imaged in ways which can be isolated from each other, can abut one another at one or more points, can partially overlap one another, or can completely overlap one another. The resulting printed page or graphic image is therefore made up of a patchwork of shapes representing the graphic objects, some of which are "clipped" by objects imaged later in the succession.

In practice, every color printing system has characteristic defects which can cause subtle problems that detract from achieving the highest possible quality color printing. For example, ink jet printing must handle excessive ink coverage which can cause bleeding or spreading of colors and paper distortion. Xerographic printing contends with a different set of problems which can detract from print quality. Examples are "haloing", in which toner in one separation interferes with toner transfer at the same location in another separation, "tenting", which is toner deletion caused by high toner pile casting a mechanical or electrostatic "shadow" which prevents correct development of abutting toner, trail-edge deletion and starvation, which cause toner deletion at certain edges, or misregistration between two colors. Many of these characteristic problems in printing systems can be traced to undesirable interactions between abutting colors on the page.

Despite known problems, the digital image sent to the printer has in the past assumed a perfect printing mechanism, and provided an ideal image to print. While increasingly sophisticated controls have been added to printing mechanisms to reduce defects and come closer to the perfect printer expected by the digital image, electromechanical defects in any printing system are still common and are to be expected at both the low end where system cost restraints preclude use of expensive controls and the high-end where production speeds challenge existing control systems.

Recent work has begun to look at modifying a digital image in advance in order to pre-compensate for expected problems in a printer. A number of approaches to digital data pre-compensation are described in greater detail in the co-pending patent application "Anamorphic Object Optimized Function Application for Printer Defect PreCompensation", which is incorporated herein by reference. The invention described in "Anamorphic Object Optimized Function Application for Printer Defect PreCompensation" is able to detect and correct a wide range of printer problems related to objects of different types being printed adjacent to one another. It uses color and object information such as object type, object size in the scan and process directions, rendering intent, and other relevant object parameters to detect and pre-compensate for a large number of potential printing problems such as trail-edge deletion and starvation (where toner concentrations drop at certain color edges), misregistration, haloing (where toner concentrations drop when certain colors are surrounded by other colors), halftone mismatch (where objects rendered with different halftones meet), and so on.

Because such a large number of printing problems are being addressed, it is important in the detection phase to have a search mechanism which can quickly and efficiently recognize patterns of pixels that are predicted to cause printing problems, and efficiently apply the appropriate pre-compensations to correct those problems.

The co-pending application "Anamorphic Object Optimized Function Application for Printer Defect Pre-Compensation" describes the step whereby a band of scanlines is searched for potential printing defects, but is not particularly concerned with developing an efficient search mechanism. A general method is described whereby printer defects are detected and corrected in a serial, in-line fashion, one module at a time, which achieves the goal of the search step without necessarily achieving optimum efficiency. In the method described, the invention includes a module called a "filter" for each printer defect that is to be identified and corrected. It specifies that each filter for each printing defect must accomplish two tasks: first, it must recognize the conditions in a band of scanlines that will trigger its specific printing defect, and second, it must apply a function that changes the attributes of the affected runs in order to pre-compensate for the expected defect.

To accomplish these detect-and-correct steps, a pointer to the band of scanlines is passed to each of the filters in turn. Each filter searches the band of scanlines in order to determine if the criteria for its particular printing defect have been met. If so, each filter applies a correction to the digital data within that band of scanlines, and control passes to the next filter in the chain which repeats the same steps of analyzing the band of scanlines for defects which it is able to predict, and correcting the defects if found.

The method of allowing each filter in turn to examine the current band of scanlines and correct them is a general search method that will work in all cases and is therefore a preferred embodiment for the general solution described in "Anamorphic Object Optimized Function Application for Printer Defect Pre-Compensation".

The current invention instead proposes a method for detection and correction of printer defects that need not work for the general case of all printer defects but works with most defects and is designed for efficiency. This is important because if many printer defects are to be searched, it is important that system speed not be unduly sacrificed for higher quality.

The current invention proposes that rather than each filter in turn examining the current band of scanlines for printer defects, instead each filter should register with a search module the pattern or patterns of runs that are likely to trigger its particular defect. The patterns can be encoded to be keys to a lookup table of any sort. Then, when a band of scanlines is being analyzed for likely printer defects, the search module encodes the current pattern of runs and uses that encoding as a key to lookup whether any filter has registered the current pattern as likely to cause a problem. If so, control may pass immediately to that filter or module for correction of the digital data.

OBJECTS AND SUMMARY OF THE INVENTION

One object of the present invention is to provide an efficient method for predicting, based on patterns of adjacent different colors and/or object attributes, when a particular printing problem is likely to occur from a list of potential printing problems.

Another object of the present invention is to provide an efficient method for correcting/pre-compensating for a predicted printing problem which is predicted to occur.

To achieve the foregoing and other objects and to overcome the shortcomings discussed above, a digital color printing method and system is provided which registers patterns of adjacent runs of pixels which are likely to cause potential printing problems, uses such registered patterns as keys to a lookup table, organizes bands of scanlines into patterns which can be used as keys in the same lookup table, and uses the values in the lookup table as guides to efficiently fixing the problems detected.

BRIEF DESCRIPTION OF THE DRAWINGS

The invention will be described in detail in reference to the following drawings in which like reference numerals refer to like elements and wherein.

DETAILED DESCRIPTION OF A PREFERRED EMBODIMENT

Figure 1:
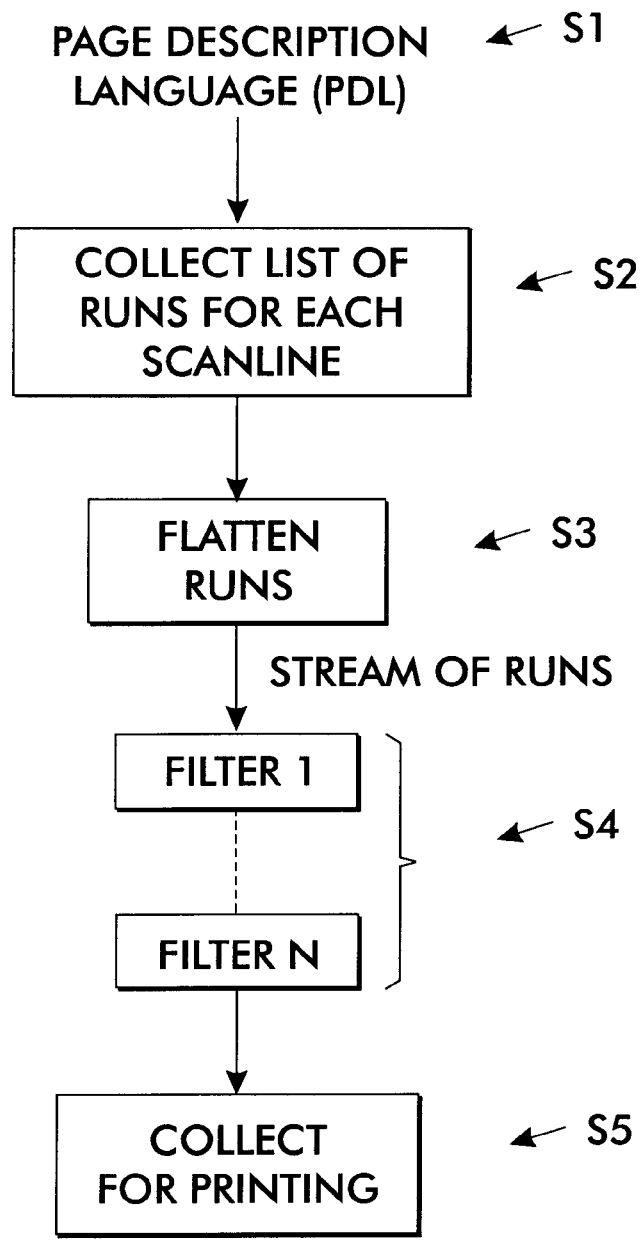
FIG. 1 shows functional blocks of a color imaging system within which a preferred embodiment of the invention may be constructed.

FIG. 1 shows an overview of the high-quality color imaging system within which a preferred embodiment of the current invention runs. The imaging system prepares pages for printing with the following steps:

1) In step S1, a page description language is received which contains instructions giving the location, shape, color, attributes, etc of printable objects on the page.

2) In step S2 the imaging system collects, for each scanline on a page, the runs of color which define the objects on that scanline, Each collected run includes a length, a color, tags identifying the source object type, and other salient parameters to aid in optimal rendering.

Figure 2:
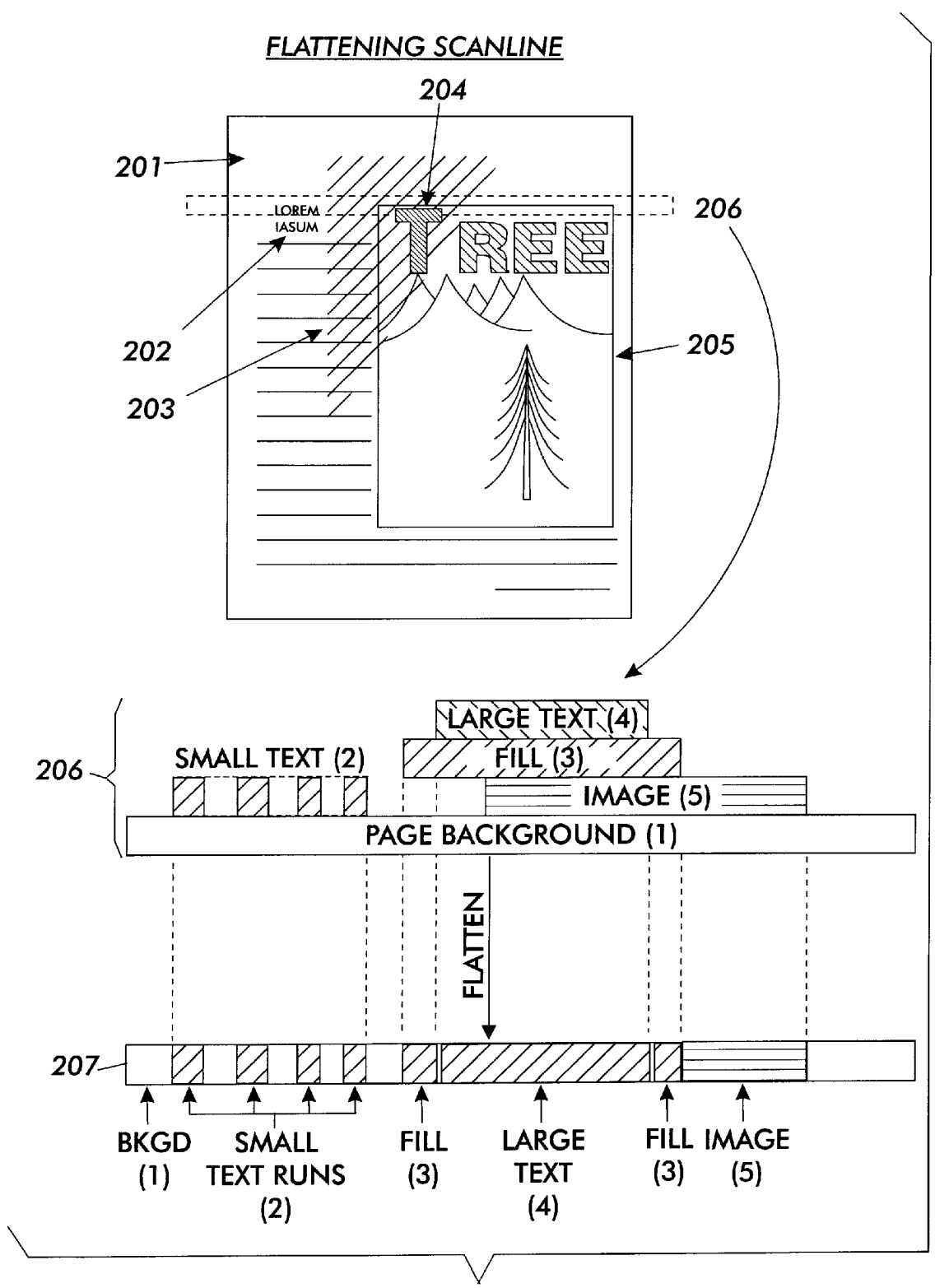
FIG. 2 shows a sample page containing objects of different type, with a single magnified scanline showing overlapping runs being "flattened" to a single stream of runs making up a scanline of data.

3) In step S3 the runs are "flattened" from overlapping, layered runs to "flat runs" that do not overlap by identifying at each point in each scanline which is the "on top" run. The process of collecting overlapping tagged runs and flattening them to a single stream of non-overlapping runs is represented in FIG. 2. FIG. 2 shows a page containing the background of the page 201, small text 202, a triangle shaped fill 203, large text 204, and an image 205. A single scanline 206 is expanded to show the way in which these various objects overlap on that scanline. Below, the same scanline is shown flattened 207, with only the run which is "on-top" now represented in flattened scanline 207.

4) Returning now to FIG. 1, in step S4 the stream of flat runs is sent to a series of "filters" which can operate in an ordered chain on individual or grouped flat runs in one or more scanlines to modify them before printing.

5) In step S5 the filtered runs are merged into the page data for printing.

In the context of this particular high-quality color imaging system, the set of filters used by a preferred embodiment of the invention includes a first filter which collects a band of scanlines, identifies patterns of runs found in that band of scanlines, and does a table lookup on each found pattern. Other following filters each load the lookup table with the patterns that each filter is looking for to correct, and are prepared if called by the first filter to modify the runs by applying functions to pre-compensate for the predicted defects. The system has user-settable parameters such as the horizon of interest in both Process (P) and Scan (S) directions (that is, the S and P distances within which printing problems will be detected), settings that balance speed vs accuracy, and settings which specify the ordered list of changes to apply to process or scan-direction edges when found.

The preferred embodiment was implemented with runs, because by definition a run is a group of pixels with the same color and tag, and the end of a run automatically signals a color or tag change where an adjacency problem might occur. It was judged that that approach should work more quickly than a pixel-based system, which has to operate on each pixel in turn and which increases in processing time with the square of the resolution as the resolution increases. Working with runs should also avoid the computational intensity of a vector-based edge identification system. However, it is clear that while the following description of a preferred embodiment is run-based, the invention described could be implemented in a pixel-based or vector-based system as well.

In greater detail, the high-quality imaging system takes the following steps in preparing data to be analyzed for patterns that might predict printing defects:

For review, as shown in FIGS. 1 and 2 the overall color imaging system within which the invention operates interprets an incoming page description language and reduces it to a list of runs for each scanline. It then "flattens" this list of runs by identifying for each portion of each scanline the "on-top" run. This creates a display list consisting of a sequence of runs for each scanline, where the run length, color, and rendering intent cumulatively paint the objects to be rendered on the page. In this particular system, a run has a start position, a length, and information about the object from which it derived, including such possible items as color, type (stroke, text, fill, etc.), and parameters such as stroke width, etc. From this information other information can be derived, such as a rendering hint saying how best to render that particular run (e.g., "preserve edges", "preserve smoothness", etc.). After flattening, the imaging system sends an ordered stream of flat runs to a chain of filters, which is able to modify the "ideal" runs for a variety of reasons, including pre-compensating for printing defects.

Figure 3:
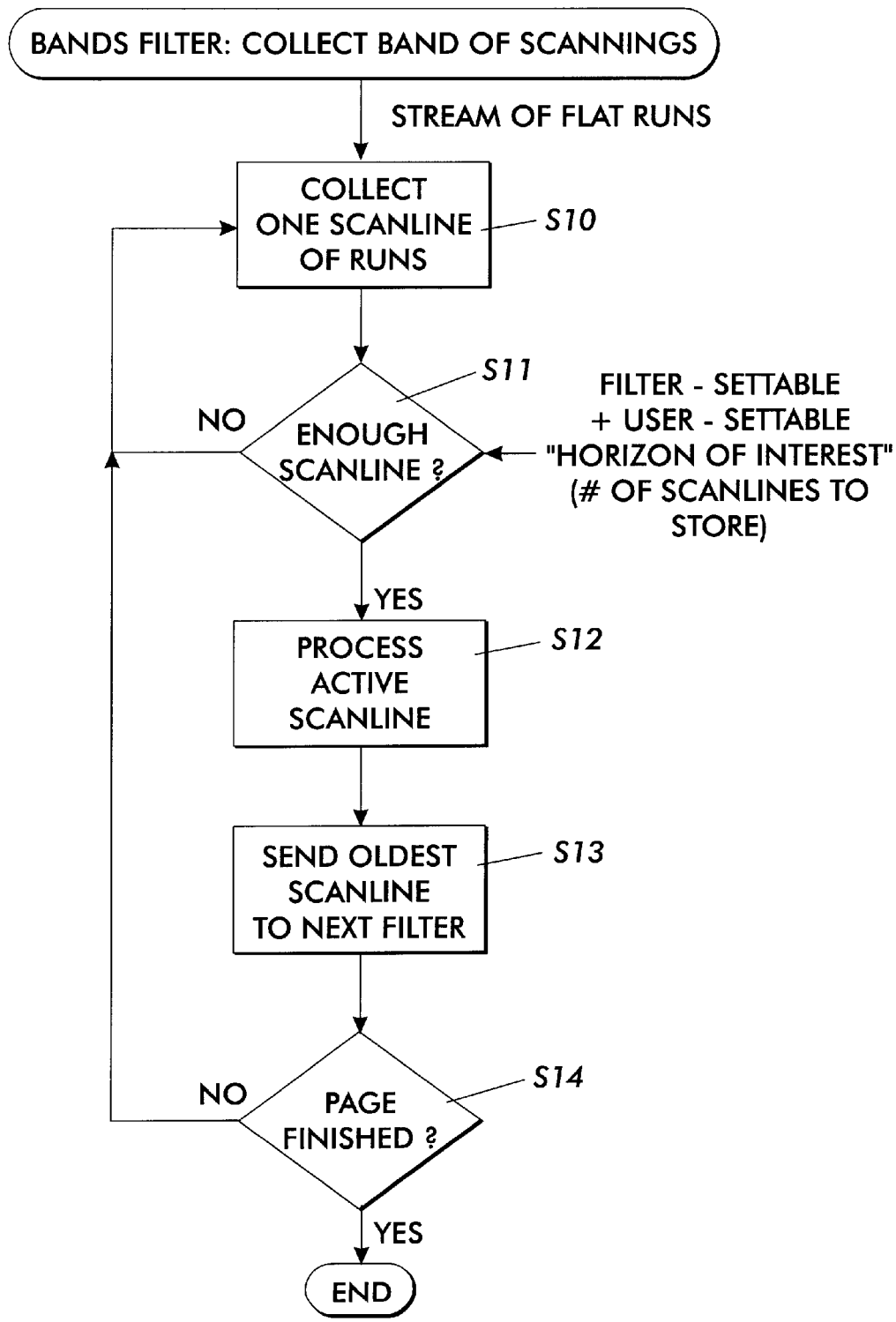
FIG. 3 shows steps used prior to the invention to collect a band of scanlines for processing.

The first filter used by the invention is a "bands" filter. The activity of collecting a band of scanlines for further processing by the invention is shown in FIG. 3. In step S10, the bands filter captures the stream of flat runs until a scanline is stored. In step S11, the number of scanlines to store (the "band-size") is input as a user-settable option or (for automatic operation) by the filters of the filter chain; it is derived from knowing how far away to look (the "horizon") for potential printer defect problems for a particular printer. For example, if trail-edge deletion can be prevented by detecting color adjacencies up to 3 scanlines above or 1 scanline below, then a band-size of 5 might be used (i.e., 1 "active" scanline to process+the 3 scanlines above+the 1 scanline below=5 scanlines).

If enough scanlines have not been collected for adequate prediction of printing problems, the bands filter returns to step S10 for further collection. If enough scanlines of runs have been collected, the filter continues to step S12 where the "active" scanline is processed. For example, in the example given in the paragraph above, the "active" scanline is number 4 out of 5 scanlines, with 3 scanlines above and 1 scanline below. Processing an active scanline is described in detail below.

Once the active scan has been processed, in step S13 the oldest scanline is passed down the filter chain to the next filter, the other scanlines propagated up, and in step S14 if the page is not finished, control returns to step S10 where a new scanline of runs is captured and stored. In this way, each scanline in turn is processed as part of a band of scanlines, and the band marches down the page processing each scanline of runs with its adjacent scanlines in turn. (Special processing is needed for the beginning and the end of a page.) At the end of the page, after processing the last scanline, step S14 ends the bands filter activity.

Processing the Active Scanline:

In general, the processing of an active scanline involves identifying and analyzing each point along the scanline where a color or attribute change occurs on ANY of the scanlines in the band. This is because we are looking for any potential edge conflicts that might lead to a printer defect within the horizon of interest (within the band).

The following notation will be used below to designate the two important directions in printing. The letter "S" will be used to designate the Scan direction (the direction of the scanlines); that is, the direction the laser beam or ink jet Scans across a page. The letter "P" will be used to designate the Process direction (the direction orthogonal to S); that is, the direction the printing Process moves down the page as the laser scans each succeeding line.

Figure 4:
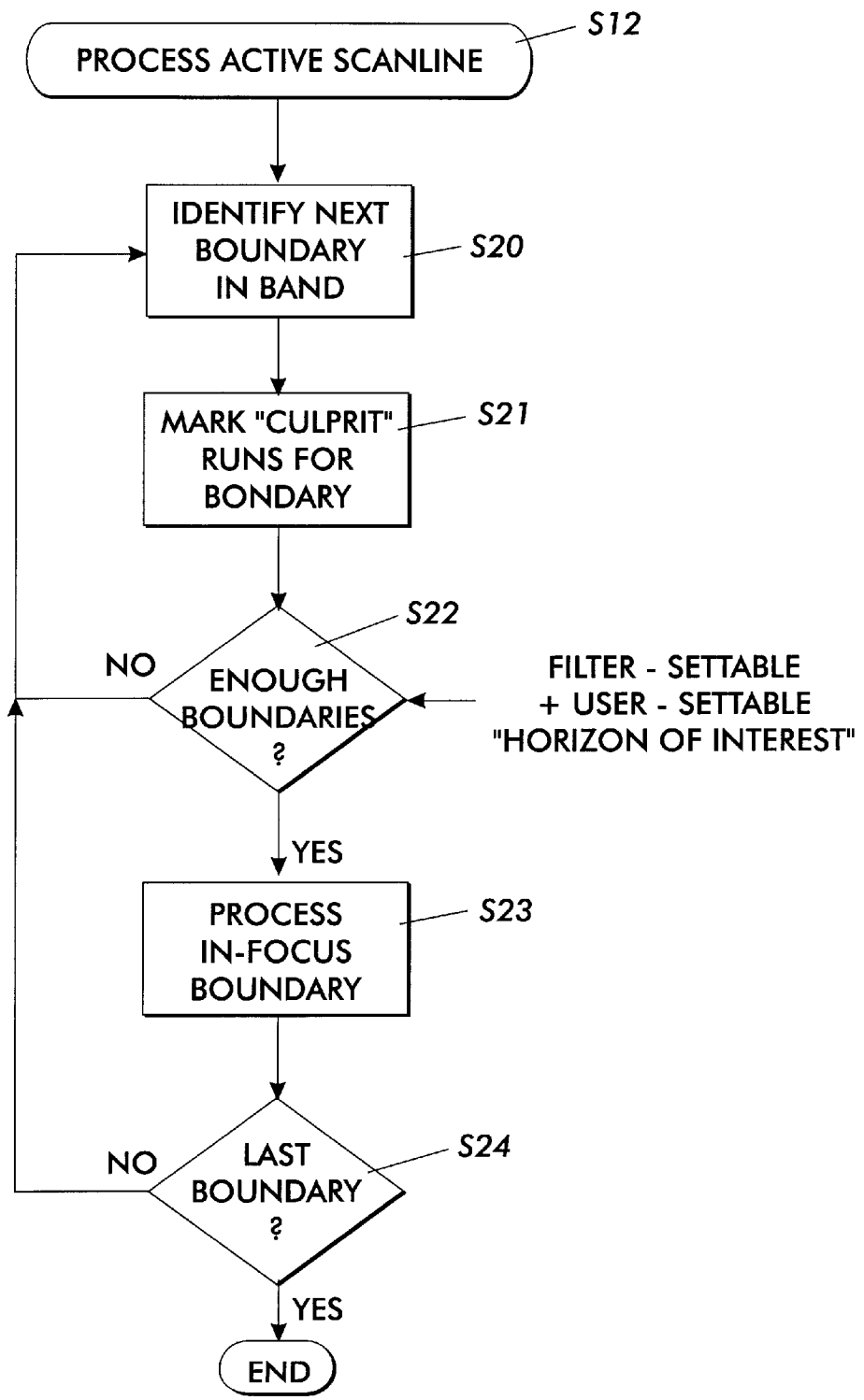
FIG. 4 shows steps used prior to the invention to process the "active scanline" of the collected band of scanlines.

The following steps are taken to process an active scanline, as shown in FIG. 4:

In step S20, each "boundary" is identified, where a boundary is a section of the band in the S direction within which there are no attribute changes (color, type, hint, etc.) in any of the band's scanlines. Starting at the beginning of the band (S=0), find the point at which a run ends on ANY of the scanlines in the band. This is the first boundary. Starting at that point, find the next point where a run ends on any of the scanlines. This is the next boundary. The actual process uses a priority queue of all the runs in the band based on their starting position in the S ("Scan") direction. By maintaining the priority queue, the next run on any of the band's scanlines is known, so the boundaries are quickly identified.

Figure 5:
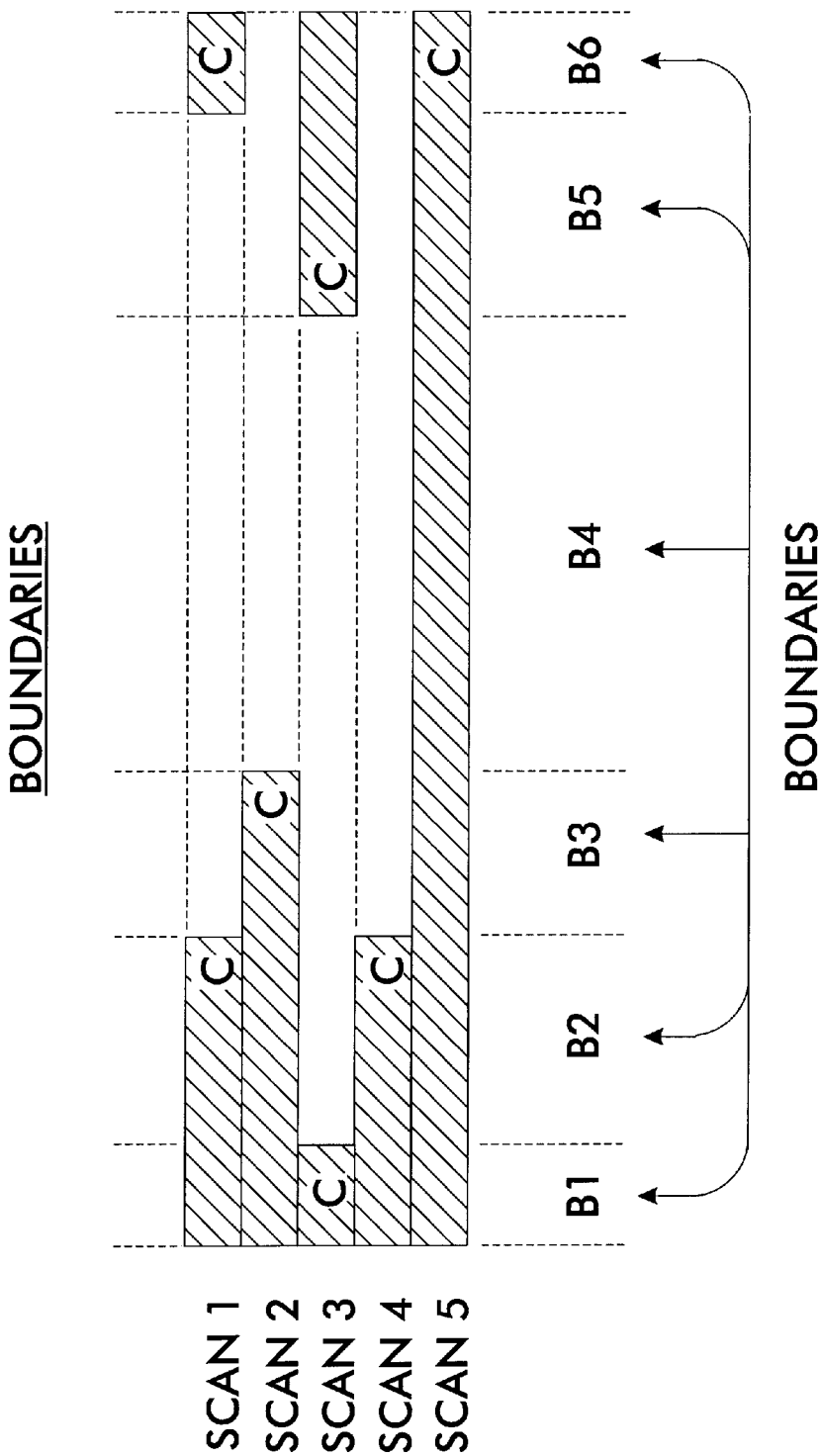
FIG. 5 shows a band of collected runs, with "boundaries" in the band of runs identified for further processing in the invention. Boundaries are regions in the band ended by a change on any of the scanlines of the band.

An example of boundaries is shown in FIG. 5, where scans Scan1–Scan5 have been collected, and boundaries B1–B6 are identified as the places in the band where a run ends on ANY of the scanlines.

The data included for each boundary is simply a pointer to each scanline's run at that point, and the "culprit" run is marked in step S21. The "culprit" run is the run whose ending caused the ending of the boundary. In FIG. 5, the culprit runs are marked with a "C". If several runs end simultaneously, the ending run nearest in the P direction to the active scanline can be marked as the "culprit" run. Alternatively, all "culprit" runs can be marked so that the downstream software can decide which is most important, either by distance or by attribute difference.

In step S22, a check is made to see if enough boundaries until have been collected and stored to cover the horizon of interest which was set for the S direction. This S-Horizon is the distance in the S direction within which it was determined by the user or the filters that adjacencies might cause problems. This collection of consecutive boundaries is called a "boundary set".

Within a boundary set, there is one "in-focus" boundary; and on both sides of it, out to the S-Horizon on each side, are the rest of the boundaries. The in-focus boundary contains an "active run", which is the run in the in-focus boundary that is on the active scanline (the scanline currently being processed). In step S23 the active run of the in-focus boundary is processed, as described in further detail below. In step S24, if this is the last "in-focus boundary in the boundary set, the process ends; otherwise, control returns to step S20 for continued processing.

Processing the In-Focus Boundary within a Boundary Set:

The bands filter, as described previously, has collected scanlines, organized them into boundary sets, identified "culprit" runs causing each boundary, chosen each active scanline to process, and within that active scanline chosen each in-focus boundary to process in turn. The processing of each in-focus boundary in an efficient way to identify and correct multiple printing defects proceeds according to the method of the invention as shown in FIG. 6.

Downstream from the bands filter are one or more filters, each of which is normally focused on predicting and pre-compensating for one particular printing defect (filters may be combined, of course). These filters are shown as F1, F2, and F-n in FIG. 6. One filter (F1) might recognize patterns of runs that lead to trail-edge deletion, described earlier as a color deletion at an edge of sufficient size in both directions. Another filter (F2) might focus, as mentioned earlier, on adjacencies which lead to "haloing", in which a group of runs of certain colors completely surrounded by a group of runs of different color might lead to the surrounding color being lightened. Another filter might look for adjacencies of rendering intent or object type which would lead to visible artifacts at the boundary between two halftones. Another might be focused on the problem of predicting color adjacencies which might cause misregistration artifacts. Many filters are possible, depending on the particular edge defects of a particular printing system. For example, a filter might look for starvation effects, in which a leading edge in the Process direction of sufficient width in the Scan direction is followed by a sufficiently large fill of uniform color. In this case, some printing systems will show color deletion at the leading edge which can be pre-compensated for. Extra filters such as these examples are grouped in FIG. 6 as F-n.

Each printing system might exhibit different defects to a greater or lesser extent. However, the invention specifies that each filter for each printing defect must accomplish two tasks: first, it must register with a central registration mechanism a pattern(s) of runs within a band for which it should be called (because that pattern may trigger its specific printing defect), and second, it must be able to apply a function if an applicable pattern is found that changes the attributes of the affected runs to pre-compensate for the defect. The "active run", again, is the run in the in-focus boundary that is on the current "active scanline".

Figure 6:
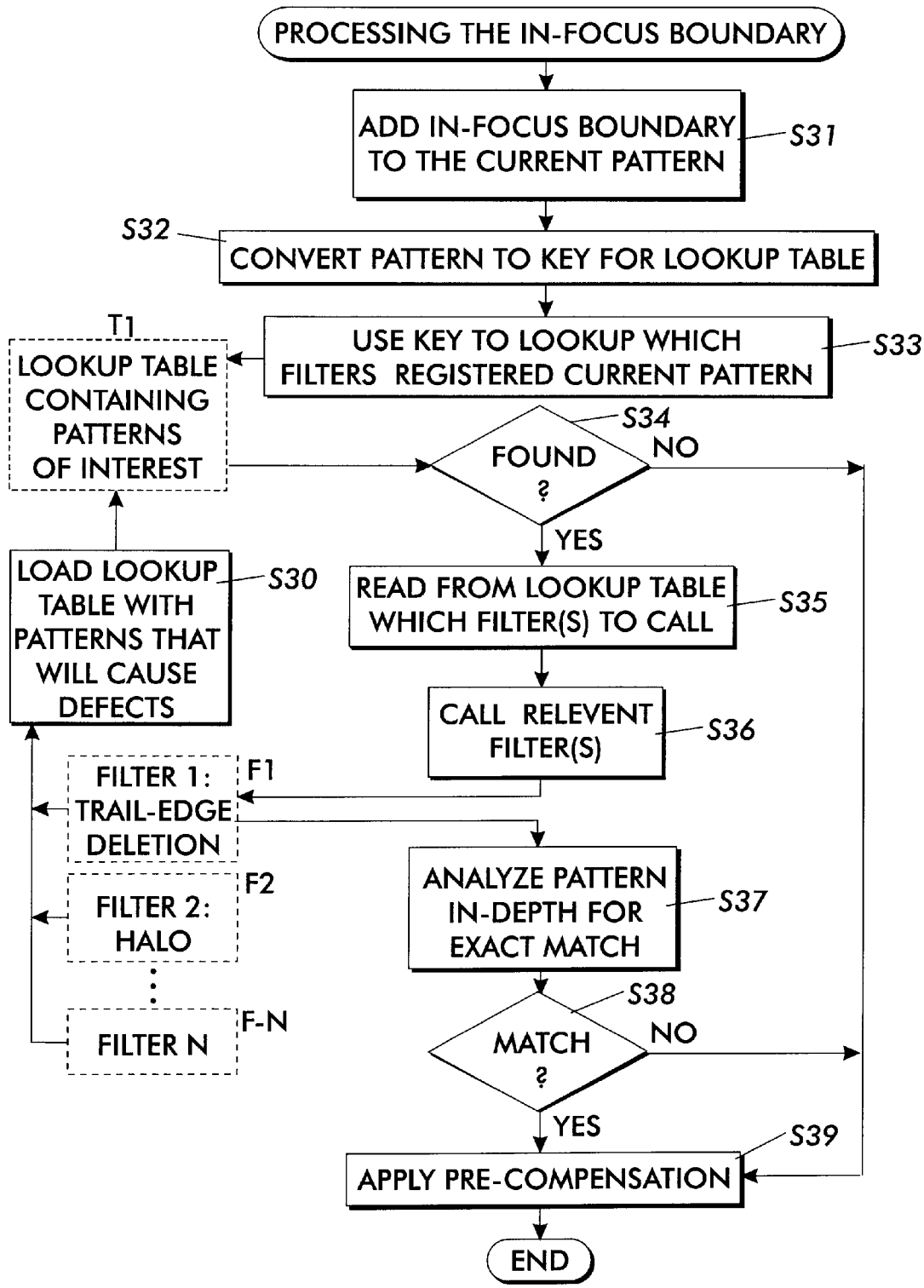
FIG. 6 shows processing steps by which an in-focus boundary is processed in the current invention, wherein a pattern which predicts a certain printing problem is looked up and a filter which registered that pattern is called to apply changes to the run attributes to mask or eliminate the problem.

Continuing with FIG. 6, in order to process an in-focus boundary, in step S30 each filter "registers" the run patterns with which it is concerned. Though many registration mechanisms are possible, in this preferred embodiment, a pattern of runs is reduced to a mathematical expression which can constitute a unique "key", or lookup address, into a provided lookup table Ti. In this case, the key is a mathematical representation of a particular pattern of runs used as an address into a lookup table, and the value loaded into the table is a pointer to the filter or filters to be called whenever that pattern of runs is encountered.

Figure 7:
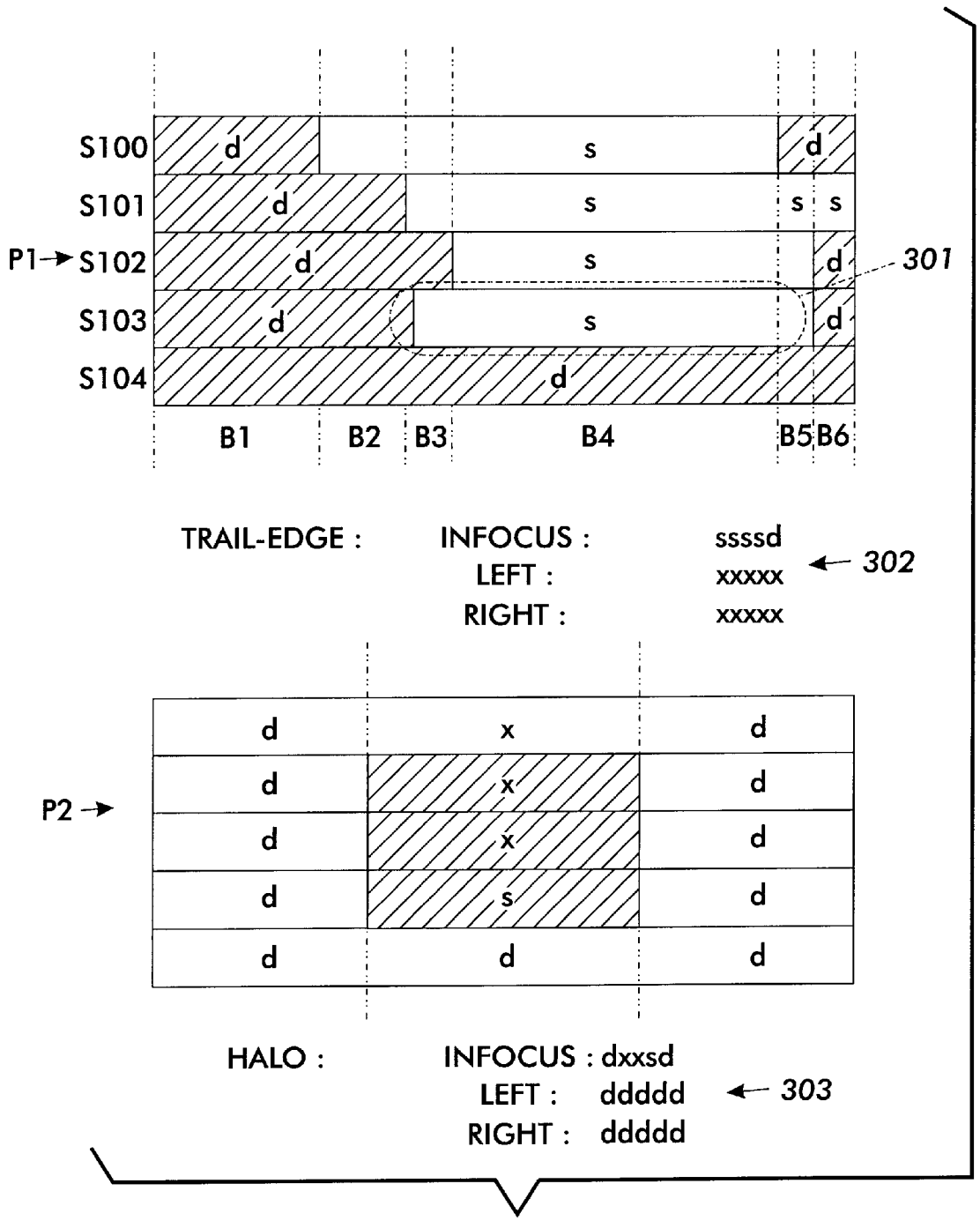
FIG. 7 shows examples of bands of scanlines that have patterns of runs associated with the trail-edge deletion and haloing printer defects.

Two examples of patterns of runs which cause printing defects is shown in FIG. 7. In FIG. 7, pattern P1 shows a pattern typical of a pattern of runs which leads to a printer defect known as trail-edge deletion. In this case, the band of scanlines consists of 5 scanlines, with the active scanline being the fourth scanline S303, and the in-focus boundary being the fourth boundary B4. To trigger trail-edge deletion in the in-focus boundary, there must be a series of runs in the process direction (vertical in this illustration) that have the same color as the active run, followed by a run with different color. To the sides of the in-focus boundary, the color is not relevant, because this particular defect occurs on process-edges only, without regard to scan direction colors. This is encoded in 302 as SSSSD for the in-focus boundary, and XXXXX for the boundaries to the left and right of In-Focus. In this figure, "S" denotes that a color is the same as the active run, "D" denotes that the color is different, and "X" is used to denote a "don't care" state, where the color of a run may be either same or different. Pattern P2 shows a pattern typical of a pattern of runs which leads to a printer defect known as haloing, in which a set of runs of one color is surrounded by a set of runs of another color. This is encoded in 303 as DXXSD (in-focus), DDDDD (left) and DDDDD (right).

After each filter registers a pattern or patterns with which it is concerned in step S30 (at system start-up time or whenever a filter is added or changed), processing of the current in-focus boundary may begin.

In step S31, the next in-focus boundary pattern is formed, and in step S32 is converted to the form in which it may be used as a key to the lookup table.

In step S33 the key formed in S32 is used as an address into the lookup table T1. If an entry is not found in step S34, processing ends for this in-focus boundary. If an entry is found in step S34, then in step S35 the value is read from the table T1 which is a pointer to the filter or filters which have loaded that pattern into the table.

In step S36 the filter that was found is called and control passes to that filter. In FIG. 6, the example filter used is F1, the trail-edge deletion filter. In step S37, the trail-edge deletion filter F1 examines the current in-focus boundary in greater detail to determine if in fact all the criteria are met to cause the trail-edge deletion problem. This step is included to allow a filter to provide for more stringent criteria than may easily be encoded in a lookup table key. For example, the trail-edge deletion defect only occurs if the same-color runs ("S" in the encoding) are greater than a certain length in the Scan direction. In step S37, any additional criteria such as this are checked.

In step S38, if the additional criteria are not found, processing of this in-focus boundary ends. If the criteria are met, however, then processing proceeds to step S39, where the filter that is currently active modifies the runs to pre-compensate for the printing defect being addressed by that filter. When the runs are modified by all filters that registered the pattern that had been found in step S32, processing of the in-focus boundary ends.

By using an efficient search mechanism that pinpoints in one lookup which filters among potentially many filters might be interested in correcting the current set of runs in the in-focus boundary, a wide range of printer problems can potentially be detected without great loss of performance, and modifications can efficiently be applied to pre-compensate for a large number of printer problems.

While the above is a complete description of a preferred embodiment of the invention, various alternatives, modifications, and equivalents are possible. Therefore, the above description does not limit the scope of the present invention. The appended claims define the scope of the invention.

What is claimed is:

1. In a printing system which prints digital data, said data specifying attributes for points on a page, wherein said printing system exhibits a known potential printing defect caused by a known pattern of pixels, said pattern including at least two pixels with different said attributes, and wherein said defect is advantageously modified by applying an associated known modifying function to said pattern of pixels, a method of printing said digital data including the steps of:

registering said known pattern of pixels, said registration comprising storing said known pattern of pixels in a storage area in association with said modifying function, searching said digital data to find said known pattern, if said known pattern is found, looking up said known pattern in said storage area to retrieve said modifying function, applying said modifying function to said found pattern to advantageously modify said digital data, and printing said modified digital data.

2. The method of claim 1 wherein said storage area comprises a lookup table.

3. The method of claim 2 wherein said storing step comprises mathematically reducing said known pattern of pixels to an address in said lookup table, and placing said associated modifying function as a value in said lookup table at said address.

4. The method of claim 3 wherein said placing step comprises storing a pointer to a software module that implements said associated modifying function.

5. The method of claim 1 wherein said searching step comprises establishing a window of size sufficient to contain said known pattern of pixels, said window containing an active area of at least one pixel, moving said window through said digital data from beginning to end, and at each position of said window, determining if said active area and surrounding pixels comprise said known pattern of pixels.

6. The method of claim 3 wherein said searching step comprises establishing a window of size sufficient to contain said known pattern of pixels, said window containing an active area of at least one pixel, moving said window through said digital data from beginning to end, and at each position of said window, determining if said active area and surrounding pixels comprise said known pattern of pixels, wherein said determining step comprises mathematically reducing said active area and surrounding pixels to an address in said lookup table, and looking up said address in said lookup table to determine if a modifying function has been placed at said address.

* * * * *